United States Patent
Coors et al.

(10) Patent No.: US 8,338,038 B2
(45) Date of Patent: Dec. 25, 2012

(54) ELECTROCHEMICAL CELL COMPRISING IONICALLY CONDUCTIVE MEMBRANE AND POROUS MULTIPHASE ELECTRODE

(75) Inventors: W. Grover Coors, San Diego, CA (US); John Howard Gordon, Salt Lake City, UT (US); Sophie Gisele Menzer, Lakewood, CO (US)

(73) Assignee: Ceramatec, Inc, Salt Lake City, UT (US)

( * ) Notice: Subject to any disclaimer, the term of this patent is extended or adjusted under 35 U.S.C. 154(b) by 0 days.

(21) Appl. No.: 12/699,396

(22) Filed: Feb. 3, 2010

(65) Prior Publication Data

US 2010/0297537 A1 Nov. 25, 2010

Related U.S. Application Data

(63) Continuation-in-part of application No. 12/558,363, filed on Sep. 11, 2009.

(60) Provisional application No. 61/149,671, filed on Feb. 3, 2009, provisional application No. 61/096,605, filed on Sep. 12, 2008.

(51) Int. Cl.
*H01M 10/0562* (2010.01)
*H01M 10/30* (2006.01)
*H01M 4/32* (2006.01)
*H01M 4/40* (2006.01)
*H01M 4/62* (2006.01)
*H01M 4/86* (2006.01)

(52) U.S. Cl. ............. 429/321; 429/223; 429/231.9; 429/231.95; 429/232; 429/322; 429/119; 429/532

(58) Field of Classification Search .................. None
See application file for complete search history.

(56) References Cited

U.S. PATENT DOCUMENTS

| | | | |
|---|---|---|---|
| 4,465,744 A | 8/1984 | Susman et al. |
| 5,670,270 A | 9/1997 | Wallin |
| 5,937,264 A | 8/1999 | Wallin |
| 6,017,647 A | 1/2000 | Wallin |
| 6,099,985 A | 8/2000 | Elangovan et al. |

(Continued)

FOREIGN PATENT DOCUMENTS

JP 08-287926 11/1996
KR 10-2004-0047664 6/2004

OTHER PUBLICATIONS

EPO Machine Translation of KR-10-2004-0047664, 1-10.
IPDL Machine Translation of JP-08-287926 Abstract, 1-1.
Park, Jin "PCT International Search Report", Int. App. No. PCT/US2010/023038, 1-3.

(Continued)

*Primary Examiner* — Jonathan Crepeau
(74) *Attorney, Agent, or Firm* — David Fonda (57) ABSTRACT

An electrochemical cell in accordance with one embodiment of the invention includes a first electrode containing a first phase intermixed with a second phase and a network of interconnected pores. The first phase contains a ceramic material and the second phase contains an electrically conductive material providing an electrically contiguous path through the first electrode. The electrochemical cell further includes a second electrode containing an alkali metal. A substantially non-porous alkali-metal-ion-selective ceramic membrane, such as a dense Nasicon, Lisicon, Li β"-alumina, or Na β"-alumina membrane, is interposed between the first and second electrodes.

12 Claims, 7 Drawing Sheets

U.S. PATENT DOCUMENTS

| | | | |
|---|---|---|---|
| 6,451,485 B1 * | 9/2002 | James et al. | 429/232 |
| 2006/0240328 A1 * | 10/2006 | Takami et al. | 429/329 |
| 2008/0226984 A1 * | 9/2008 | Lee et al. | 429/207 |
| 2010/0068629 A1 * | 3/2010 | Gordon | 429/325 |

OTHER PUBLICATIONS

Park, Jin "PCT Written Opinion", Int. App. No. PCT/US2010/023038, 1-5.

* cited by examiner

ELECTROCHEMICAL CELL COMPRISING IONICALLY CONDUCTIVE MEMBRANE AND POROUS MULTIPHASE ELECTRODE

RELATED APPLICATIONS

This application claims priority to U.S. Provisional Application No. 61/149,671 filed on Feb. 3, 2009, entitled ELECTROCHEMICAL CELL WITH IONIC CERAMIC MEMBRANE AND POROUS MULTIPHASE ELECTRODE and this application is also a continuation-in-part of U.S. Application No. 12/558,363, filed on Sep. 11, 2009, entitled ALKALI METAL SEAWATER BATTERY, which claims priority to U.S. Provisional Application No. 61/096,605, filed Sep. 12, 2008, entitled LITHIUM SEAWATER BATTERY USING LITHIUM CONDUCTIVE MEMBRANES. These applications are hereby incorporated by reference.

BACKGROUND OF THE INVENTION

1. Field of the Invention

This invention relates to electrochemical cells, and more particularly to novel electrodes and membranes for electrochemical cells.

2. Background

Our society has come to rely on electrochemical cells, such as batteries, fuel cells, and electrolytic cells, to perform a wide variety of functions. Batteries in particular are used to power a myriad of devices, including computers, cell phones, portable music players, lighting devices, as well as many other electronic components. Batteries are currently being developed to power automobiles and/or provide load-leveling capabilities for wind, solar, or other energy technologies. The "information age" increasingly demands portable energy sources that provide lighter weight, higher energy, longer discharge times, more "cycles", and smaller customized designs. To achieve these advances, technologists continue to work to develop batteries with higher energy densities while still providing acceptable safety, power densities, cost, and other needed characteristics.

Batteries and other electrochemical cells come in a wide variety of different chemistries and structures. Each chemistry and/or structure has different advantages and disadvantages. For example, batteries that utilize dense ceramic membranes as the primary electrolyte advantageously have higher faradaic efficiencies (in some cases, close to 100 percent) and longer shelf lives (i.e., lower rates of self-discharge) than other battery chemistries. Nevertheless, batteries that utilize dense ceramic membranes as the primary electrolyte have their drawbacks. For example, these ceramic materials are often brittle, making them susceptible to breakage and catastrophic failure. These ceramic materials may also be poor ion conductors at room temperature.

For example, Nasicon is one type of ceramic material that is selective to sodium ions (i.e., conducts only sodium ions). However, the room temperature ionic conductivity of this material is only about 1 mS/cm, so that even modest Na flux densities require membranes less than 100 microns thick. A Nasicon membrane of this thickness is too fragile to be utilized in free-standing applications. Another challenge of using ceramic membranes in electrochemical cells such as batteries, fuel cells, or electrolytic cells is that of providing a good three-phase boundary exchange between a reactant (which may be gaseous or liquid or a reactant dissolved in a liquid), an electronically conductive phase, and an ionically conductive ceramic solid phase.

In view of the foregoing, what are needed are structures and methods for utilizing dense ionically conductive ceramic membranes, such as Nasicon or Lisicon, as the primary electrolytes in electrochemical cells, such as batteries, fuel cells, and electrolytic cells. Further needed are structures and methods to increase the mechanical robustness of such dense ceramic membranes. Yet further needed are structures and methods to provide a good three-phase boundary exchange between a reactant, an electronically conductive phase, and an ionically conductive ceramic solid phase.

SUMMARY

The invention has been developed in response to the present state of the art and, in particular, in response to the problems and needs in the art that have not yet been fully solved by currently available structures and methods. Accordingly, the invention has been developed to provide structures and methods to overcome various shortcomings of the prior art. The features and advantages of the invention will become more fully apparent from the following description and appended claims, or may be learned by practice of the invention as set forth hereinafter.

In a first aspect of the invention, a multiphase electrode for inclusion in an electrochemical cell is disclosed. The multiphase electrode includes a first phase comprising a ceramic material that is selective to alkali metal-ions. The multiphase electrode further includes a second phase intermixed with the first phase. The second phase includes an electrically conductive material that provides a contiguous electrical path through the multiphase electrode. The multiphase electrode further includes a network of interconnected pores interspersed through the first and second phases, thereby allowing an electrolyte to permeate the multiphase electrode.

In a second aspect of the invention, a multi-layer structure for inclusion in an electrochemical cell is disclosed. The multi-layer structure includes a multiphase electrode containing a first phase intermixed with a second phase and a network of interconnected pores. The first phase contains a ceramic material and the second phase contains an electrically conductive material providing an electrically contiguous path through the multiphase electrode. The multi-layer structure further includes a substantially non-porous membrane, containing an alkali-metal-ion-selective ceramic material, which is physically attached to the multiphase electrode.

In a third aspect of the invention, an electrochemical cell is disclosed. The electrochemical cell includes a first electrode containing a Nasicon phase intermixed with a nickel phase and a network of interconnected pores. The nickel phase forms an electrically contiguous path through the first electrode. The electrochemical cell further includes a second electrode containing the alkali metal sodium (Na). A substantially non-porous Nasicon membrane is interposed between the first and second electrodes.

In a fourth aspect of the invention, an electrochemical cell in accordance with the invention includes a first electrode containing a first phase intermixed with a second phase and a network of interconnected pores. The first phase contains a ceramic material and the second phase contains an electrically conductive material providing an electrically contiguous path through the first electrode. The electrochemical cell further includes a second electrode containing an alkali metal. A substantially non-porous alkali-metal-ion-selective ceramic membrane is interposed between the first and second electrodes.

In a fifth aspect of the invention, a method for fabricating a portion of an electrochemical cell is disclosed. Such a method includes mixing a first phase, containing a ceramic material, with a second phase, containing a metal oxide, to produce a mixture. The method then includes preparing a first layer comprising the mixture, and preparing a second layer comprising a ceramic material that is selective to alkali metal ions. The method then places the first and second layers adjacent to one another to form a multi-layer structure. The method then sinters the multi-layer structure at an elevated temperature to form a multiphase electrode bonded to a substantially non-porous alkali-metal-ion-selective ceramic membrane.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1A:
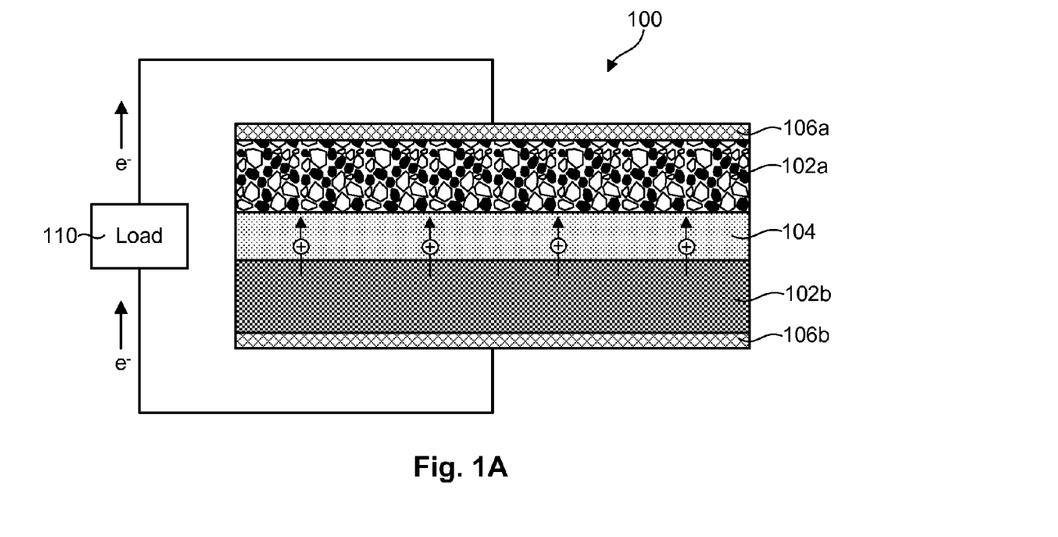
FIG. 1A is a high-level, cross-sectional view of one embodiment of an electrochemical cell in accordance with the invention, with current flowing in a first direction.

Referring to FIG. 1A, one embodiment of an electrochemical cell 100 in accordance with the invention is illustrated. The electrochemical cell 100 may be a battery 100, a fuel cell 100, an electrolyzer cell 100, or the like. As shown, the electrochemical cell 100 includes first and second electrodes 102a, 102b, and an ionically conductive membrane 104 to conduct ions between the first and second electrodes 102a, 102b. Current collectors 106a, 106b, such as electrically conductive meshes or screens, may be placed adjacent to the electrodes 102a, 102b to collect electrical current therefrom or provide electrical current thereto.

The ionically conductive membrane 104 may be fabricated from a dense ceramic material that is selective to alkali metal ions. For example, the dense ceramic material may be dense Nasicon or Na β"-alumina, which is selective to sodium ions, or dense Lisicon or Li β"-alumina, which is selective to lithium ions, depending on the desired chemistry of the electrochemical cell 100. Lisicon is a class of lithium conductive ceramics which include: $Li_{2+2x}Zn_{1-x}GeO_4$ (−0.36<x<0.87), $Li_{14}ZnGe_4O_{16}$, and slight variations in stoichiometry and with amounts of cation substitution. Here we use Lisicon to also include the lithium aluminum titanium phosphate family of compositions including, but not limited to, ceramic membranes having the formula $Li_{1+x}Al_xTi_{2-x}(PO_4)_3$, where x is between 0.0 and 0.5; and $Li(1+x+4y)Al_xTi(1-x-y)(PO_4)_3$ where x and y are between 0.0 and 0.5 and where slight substitutions of cations may be made to improve properties. The lithium-ion-conductive glass ceramic may include but are not limited to compositions in the lithiumaluminosilicate glass ceramics and $Li_{1.5}Al_{0.5}Ge_{1.5}(PO_4)_3-xLi_2O$ (x=0.0-0.20).

Nasicon compositions may include but are not limited to $Na_3Zr_2Si_2PO_{12}$, $Na_{1+x}Si_xZr_2P_{3-x}O_{12}$ (x from 1.6 to 2.4), Y-doped Nasicon ($Na_{1+x+y}Zr_{2-y}Y_ySi_xP_{3-x}O_{12}$, $Na_{1+x}Zr_{2-y}Y_ySi_xP_{3-x}O_{12-y}$, where x=2, y=0.12) and Fe-doped Nasicon ($Na_3Zr_2/_3Fe_4/_3P_3O_{12}$).

Where the electrochemical cell 100 is a battery 100, the dense ceramic membrane 104 will keep the electrolyte mixtures (i.e., the anolyte and catholyte mixtures) at the electrodes 102a, 102b from mixing, thereby improving the battery's faradaic efficiency and shelf life.

As previously mentioned, the room temperature ionic conductivity of Nasicon is only about 1 mS/cm. This, in some applications would require a membrane 104 that is less than about 100 microns thick to achieve desirable sodium-ion flux densities. A Nasicon membrane 104 of this thickness is too fragile to be utilized in free-standing applications. Thus, in selected embodiments, the membrane 104 is electrode-supported to provide adequate mechanical strength and durability to the membrane 104. An electrode-supported membrane 104 may enable membranes 104 that are less than about 2000 microns thick, less than about 100 microns thick, and in some embodiments less than about 25 microns thick to be fabricated.

As previously mentioned, one of the primary challenges of using an ionically conductive ceramic membrane 104 in electrochemical cells 100 such as batteries, fuel cells, or electrolytic cells is that of providing a good three-phase boundary exchange between a reactant (which may be gaseous or liquid or a reactant dissolved in a liquid), an electronically conductive phase, and an ionically conductive ceramic solid phase. To address this challenge, a multiphase electrode 102a in accordance with the invention may be used in the electrochemical cell 100. This multiphase electrode 102a may, in certain embodiments, also provide the mechanical support to the membrane 104.

To provide the above-described three-phase boundary exchange, the multiphase electrode 102a includes a first phase (represented by the unfilled particles) intermixed with a second phase (represented by the filled particles) and a network of interconnected pores (represented by the open space between the particles). These phases together form a cermet. More specifically, the first phase contains a ceramic material that is the same as or has similar properties to the ceramic material in the membrane 104, as will be explained in more detail hereafter. The second phase contains an electrically conductive material, such as a metal (e.g., Ni, Cu, Fe, Co, etc.) or an electrically conductive non-metal (e.g., $Ti_4O_7$). The amount of second phase relative to the amount of first phase is sufficient to achieve electronic percolation of the second phase, meaning that the second phase provides an electrically contiguous path through the multiphase electrode 102a. Because metals such as nickel may be costly, the amount of metal in the multiphase electrode 102a may be just enough to achieve electronic percolation, thereby minimizing costs.

As explained above, the ceramic material in the multiphase electrode 102a is either the same as or has similar properties to the ceramic material in the membrane 104. For example, the ceramic material in the multiphase electrode 102a and the membrane 104 may be selected to have coefficients of thermal expansion (CTEs) that are similar or identical over the entire application temperature range of the electrochemical cell 100. This will ensure that the interface between the multiphase electrode 102a and the membrane 104 never exceeds some threshold amount of tension (thereby preventing cracking or delamination). Similarly, ceramic materials may be selected that exhibit similar shrinkage during ceramic processing (during which the ceramics may experience a wide range of temperatures) to reduce tension between the multiphase electrode 102a and the membrane 104. The ceramic materials in the multiphase electrode 102a and the membrane 104 may also be selected to ensure that an adequate bond is formed therebetween. Ideally, the ceramic materials in the multiphase electrode 102a and the membrane 104 are the same, although this may not always be necessary or even desirable.

As further explained above, the multiphase electrode 102a is permeated with a network of interconnected pores. This open porosity permits an electrolyte (such as a Na-ion electrolyte where the membrane 104 is a Na-ion conductor) and reactant or product phases to freely flow through the multiphase electrode 102a to and from the active membrane surface. The porosity also provides open volume for solid product phases (e.g., Ni) to deposit without stressing the electrode 102a. As will be explained in more detail in association with FIG. 2, during the fabrication process, the open porosity in the multiphase electrode 102a may be generated by reducing an oxide (e.g., NiO) in the multiphase electrode 102a to an electrically conductive species (e.g., Ni). During the reduction process, oxygen removed from the multiphase electrode 102a will leave voids to generate all or part of the desired open porosity. Alternatively, or in addition to the porosity generated through the reduction process, porosity may be created by adding pore formers to the ceramic slurry or mixture used to produce the multiphase electrode 102a, or by laser-cutting holes in green ceramic tape used to produce the multiphase electrode 102a, depending on the fabrication process that is used. In selected embodiments, after the desired porosity is formed therein, the multiphase electrode 102a may have a porosity of about 20 to 40 percent by volume.

In one embodiment, the electrochemical cell 100 is a sodium/nickel rechargeable battery 100. In such an embodiment, the electrode 102b is the anode 102b and the electrode 102a is the cathode 102a. The anode 102b is (or contains) sodium metal and the cathode 102a is a Ni/Nasicon cermet. A dense Nasicon membrane 104 serves as the Na-ion-selective diffusion barrier between the anode and cathode sides of the cell 100. Anolyte and catholyte solutions may be provided on each side of the membrane 104. The anolyte solution may be an aprotic organic solvent containing solvated $Na^+$ ions. Alternatively, the anode may consist of molten sodium or molten alloys containing sodium, such as sodium and potassium (NaK), in which case no secondary solution is required. The catholyte solution may be a solvent that contains both $Na^+$ and $Ni^{+2}$ ions. Since the Nasicon membrane 104 is impermeable to liquid transport, a different solvent may be employed on each side of the membrane 104. In certain embodiments, NaI, $NaClO_4$, or $NaPF_6$ in organic solvent is used as the anolyte solution and the catholyte solution may be comprised of $NiCl_2$ and NaCl in aqueous or organic solvent, although other anolyte and catholyte solutions are also possible. The sodium/nickel battery cell 100 has a standard cell potential of 2.48 volts.

Figure 1B:
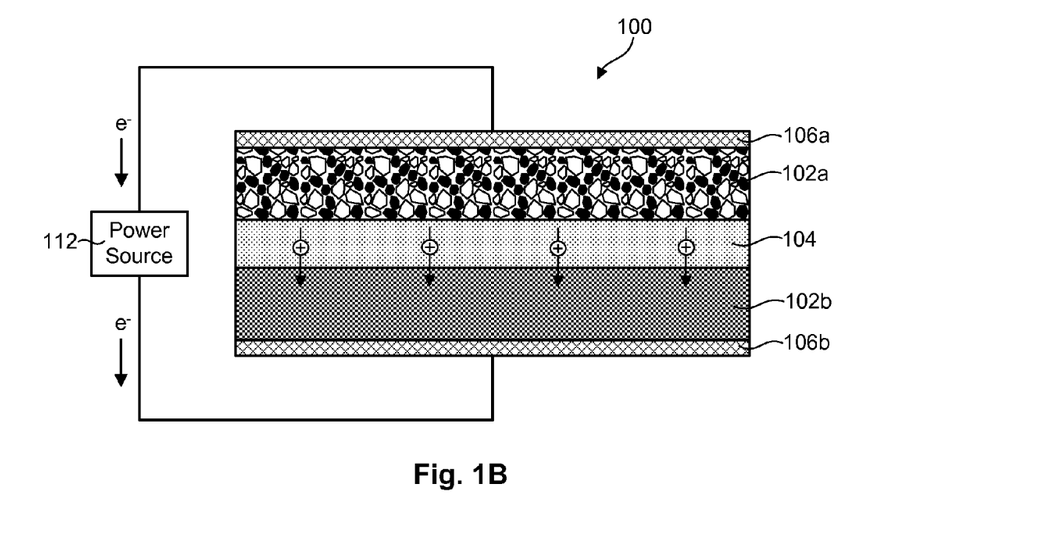
FIG. 1B is a high-level, cross-sectional view of the electrochemical cell of FIG. 1A, with current flowing in the opposite direction.

The cell half reaction for the anode 102b of the sodium/nickel battery cell 100 is:

The cell half reaction for the cathode 102a of the sodium/nickel battery cell 100 is:

The net cell reaction is:

FIG. 1A shows the movement of electrons and positive ions in the sodium/nickel rechargeable battery cell 100 upon discharging through a load 110. FIG. 1B shows the movement of electrons and positive ions in the sodium/nickel rechargeable battery cell 100 upon charging from a power source 112.

For the sodium/nickel rechargeable battery cell 100 to operate at a maximum rated power output for four hours, a large amount of Na and Ni may be exchanged during each charge and discharge cycle. Quantitatively, continuous operation at 0.05 $A/cm^2$ for four hours may involve the passage of 720 coulombs of charge, requiring at least 7.5 millimoles/$cm^2$ (0.17 g/$cm^2$) of sodium and 3.7 millimoles/$cm^2$ (0.22 g/$cm^2$)

of nickel. The cathode 102a, in one embodiment, is configured such that in the fully charged state, there is enough open volume (i.e., open porosity) to accommodate all of the solvent necessary to hold the dissolved nickel ions, and in the discharged state, there is enough open volume to accommodate the additional deposited nickel on the electrode 102a. The amount of nickel in the cathode 102a in the fully charged state should be sufficient to maintain good electrical conductivity and uniform current density throughout the electrode 102a.

Assuming that the Ni/Nasicon cermet in the cathode 102a is fabricated with the minimum amount of nickel needed to maintain good electrical conductivity and uniform current density in the charged state, then additional open volume may be required to accommodate the nickel that is deposited on the electrode surfaces during subsequent discharging. In one embodiment, the volume is 0.025 cc per $cm^2$ of cell area in the plane of the membrane 104. In other words, the volume change due to deposition and dissolution of nickel at the cathode 102a will be about 2.5 percent of the total volume if the cathode 102a is 1 cm thick, or 25 percent of the total volume if the cathode 102a is 1 mm thick. If the cathode 102a has an open volume of about 30 to 40 percent, a relatively thick cathode 102a of perhaps 3 to 5 mm may be used. Because the volume of 5 molar aqueous NaCl required at discharge is about 1.5 cc per $cm^2$ of cell area, which is 3 to 5 times greater than the available pore volume, additional volume external to the porous cermet may be used to contain the electrolyte solution.

From percolation theory involving contacting spheres of two different phases, it is possible to predict the minimum volume fraction of each phase so that each phase forms a continuous network in the bulk material. Starting with a 50/50 percent by volume NiO/Nasicon cermet, upon reduction, the cermet becomes 30/50 percent by volume Ni/Nasicon with 20 percent open porosity due to loss of oxygen. An additional 10 to 20 percent of open porosity may be achieved by using binders and pore formers in the green ceramic matrix. However, 25 percent by volume Ni is typically enough to achieve electronic percolation. A reasonable target ratio for the cermet is 25/45/30 percent by volume Ni/Nasicon/porosity, although this ratio is presented only by way of example and not limitation. In one embodiment, all Nasicon grains are interconnected such that volume changes of the nickel phase will not cause the structure to fracture or fail.

The electroactive surface area of the nickel phase in the cermet may be estimated by modeling the nickel particles as 1 micron spheres packed in a simple cubic array. Where the Ni is 25 percent by volume of the cermet, there are approximately $0.25 \times 10^{12}$ spheres per cubic centimeter, providing about 0.8 $m^2$ of electroactive surface area per cubic centimeter of cermet. This provides enough electroactive surface area to ensure good charge transfer kinetics as long as every nickel particle is in direct contact with the conducting matrix.

Another embodiment of a electrochemical cell 100 in accordance with the invention is a lithium/nickel rechargeable battery 100. This rechargeable battery 100 includes a cathode 102a that comprises a porous Ni/Lisicon cermet and an anode 102b that comprises lithium metal. The anode 102b and cathode 102a are separated by a dense Lisicon membrane 104.

Figure 2:
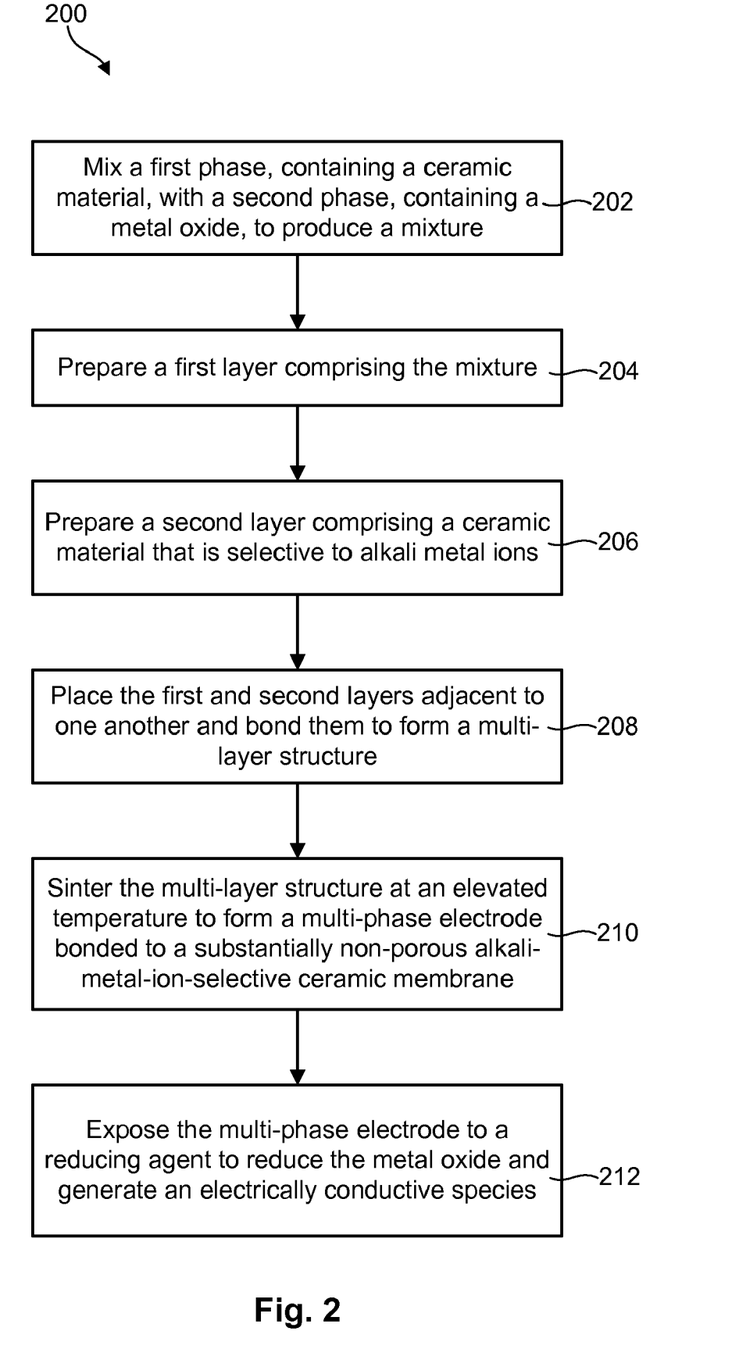
FIG. 2 is a flow chart showing one embodiment of a method for fabricating a multiphase electrode and an ionically conductive membrane for an electrochemical cell.

Referring to FIG. 2, one embodiment of a method 200 for fabricating a multiphase electrode 102a and an ionically conductive membrane 104 is illustrated. In selected embodiments, such a method 200 includes initially mixing 202 a first phase, comprising a ceramic material (e.g., Nasicon powder), with a second phase, comprising a metal oxide (e.g., NiO powder), to produce a mixture. Optionally, a pore former may be added to the mixture to produce additional porosity in the resulting structure. A first layer comprising the mixture may then be prepared 204. For example, the first layer may be prepared 204 by creating a slurry containing the first and second phases in powder form, a binder, a plasticizer, a pore former, and a solvent. The slurry may then be cast to produce a first tape having a desired thickness.

A second layer comprising a ceramic material (e.g., Nasicon powder) that is selective to alkali metal ions may then be prepared 206. For example, the second layer may be prepared 206 by creating a slurry containing the ceramic material in powder form, a binder, a plasticizer, and a solvent. This slurry may then be cast to produce a second tape having a desired thickness.

The first and second layers may then be placed 208 adjacent to one another and bonded to form a multi-layer structure. For example, the two tapes may be laminated together using heat and pressure (heat bonding) or by applying solvent such as alpha terpineol and pressure. The resulting laminate structure may then be sintered at an elevated temperature (e.g., 1000° C.) to form a multiphase electrode 102a bonded to a substantially non-porous alkali-metal-ion-selective ceramic membrane 104. This sintering process 210 will burn out any pore formers in the multi-layer structure to provide a desired porosity. The multiphase electrode 102a may then be exposed 212 to a reducing agent (e.g., a reducing gas) to reduce the metal oxide (e.g., NiO) to an electrically conductive species (e.g., Ni). This reduction process will add additional porosity to the multiphase electrode 102a and convert the oxide to an electrically conductive phase. In one embodiment, the above method is performed without the step of producing the second layer to form a multiphase electrode 102a with an ionically conductive phase, a contiguous electronically conductive phase, but without the substantially non-porous alkali0metal-ion-selective ceramic membrane 104.

The method 200 described above is presented only by way of example and is not intended to be limiting. For example, in alternative embodiments, one or more of the first and second layers may be fabricated by packing, screen printing, or even spraying. As an example, the second layer may be produced by spraying a slurry onto the first layer, thereby forming a very thin second layer on the first layer. This technique may be used to produce very thin anode or cathode-supported membranes 104. Other variations of the methods 200 and techniques described above may be used and are within the scope of the invention.

Figure 3:
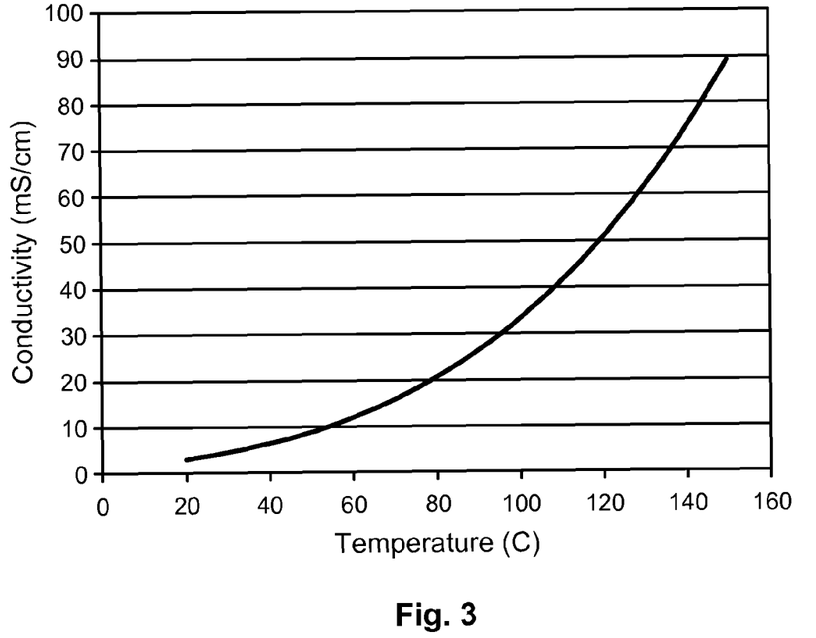
FIG. 3 is a plot showing the conductivity of Nasicon as a function of temperature.

Referring to FIG. 3, a plot showing the conductivity of Nasicon, and more specifically Nas-GY Nasicon produced by Ceramatec, Inc. of Salt Lake City, Utah ("Ceramatec") as a function of temperature is illustrated. The nominal composition of Nasicon is $Na_{1+x}Zr_2Si_xP_{3-x}O_{12}$ (where x is between 0 and 3). The term "Nasicon" was derived from the phrase Na Super Ion Conductor to highlight the material's very high ionic conductivity. The highest conductivities are typically achieved when x is between 2 and 2.5.

As shown in FIG. 3, Nasicon is an excellent sodium ion conductor. At the melting point of sodium (98° C.), the conductivity is an appreciable 32 mS/cm. Even at room temperature (20° C.) the conductivity is over 3 mS/cm, signaling the feasibility of using the material in a membrane 104 if the material can be made very thin. The principle advantage of Nasicon over Na β"-alumina is that it is much easier to fabricate, requiring lower sintering temperatures, so that thin supported membranes 104 can be more readily constructed.

EXAMPLE 1

Since the feasibility of fabricating low temperature cells 100 based on sodium/nickel cell electrochemistry hinges on the viability of the cermet material in the multiphase electrode 102a, certain preliminary investigations were carried out on a bulk cermet specimen with the objective of determining (1) whether Nasicon and NiO can be co-sintered to form a ceramic composite material with the two original phases distinctly separated and without introducing any new phases; (2) whether Nasicon is stable in the moist, low oxygen partial pressure ($pO_2$) environment required to reduce NiO to Ni metal; (3) whether the reduced cermet will have a microstructure and pore size distribution suitable for meeting the requirements set forth in the previous description; and (4) whether the electronic conductivity of the reduced cermet is adequate at room temperature for the application.

A single specimen was produced by mixing Nasicon powder (Ceramatec Nas-GY powder) with NiO powder (Fisher Nickel Oxide Green, part no. N69-500, lot number 953414). The equivalent weight ratio was 33.6 g Nasicon to 66.7 g NiO. The nickel oxide powder was quite fine with mean particle size $d_{50}$=0.523 μm ($d_{10}$=0.075 μm, $d_{90}$=2.099 μm). The specimen was mixed with binders and uniaxially compacted in a 1.9 cm diameter Carver die. The specimen was fired for 2 hours at 1200° C. in air in the pan of a thermal gravimetric analysis (TGA) instrument. The sintered specimen had a density of 4.29 g/cc compared to the theoretical density of the pure, dense composite of 4.985 g/cc, or 86 percent, resulting in an assumed porosity of 14 percent. The two opposing faces of the disc specimen were ground to an overall thickness of 3.80 mm and the outside diameter was left as-fired at 1.672 cm.

Specimen reduction was carried out in a special purpose apparatus consisting of a 5 cm diameter sealed ceramic process tube extending through a horizontal tube furnace for maintaining the test atmosphere. A gas mixture comprising 3 percent hydrogen and 97 percent argon was delivered to the inlet port from a mass flow controller at a flow rate of 10 sccm. An in situ zirconia oxygen sensor was used to monitor oxygen pressure. Bulk resistance (impedance) measurements were made using an Agilent 4338B milliohmmeter in four wire mode at a fixed frequency of 1000 Hz. Time, date, specimen resistance, temperature, and oxygen pressure were logged continuously by a computer using a LabVIEW data acquisition program. The calibration error due to temperature-dependent fixture resistance was less than 25 mΩ, or less than about 5 percent of the smallest total measured specimen resistance.

Figure 4:
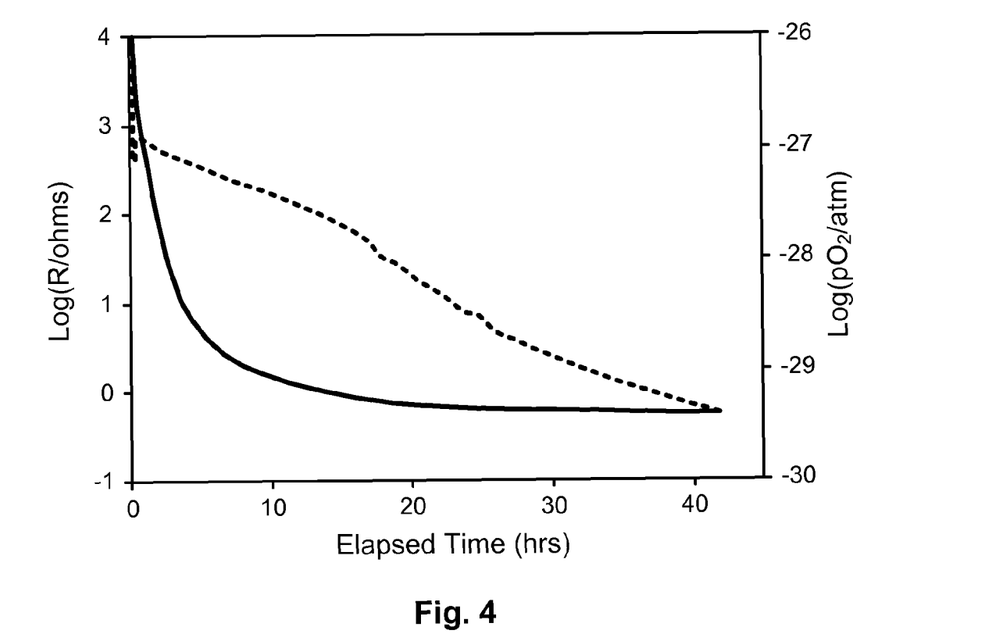
FIG. 4 is a plot showing the resistance and oxygen pressure versus elapsed time for isothermal reduction of a multiphase specimen at a steady state temperature of 515° C.

After reduction for 42 hours, the density (porosity) of the reduced specimen was measured and the specimen was notched and broken in half for a qualitative assessment of flexural strength. The specimen was subjected to XRD analysis and SEM analysis of the fracture surface as well as EDAX element mapping. The surfaces of the specimen were left bare so that subsequent analysis by XRD would be representative of the base reduced ceramic. Total specimen resistance was measured to determine how the reduction process progressed over time. The resistance and oxygen pressure versus elapsed time for isothermal reduction at 515° C. with a constant flow of 10 sccm for the reducing gas are illustrated in FIG. 4. The resistance is indicated by the solid line and the oxygen pressure is indicated by the dashed line.

As shown in FIG. 4, the specimen resistance decreased monotonically by more than four decades, reaching a terminal value of about 550 mΩ. The oxygen pressure, however, continued to drop, indicating that specimen reduction was not complete. For the reaction: $NiO(s)+H_2(g) \rightarrow Ni(s)+H_2O(g)$, where the equilibrium constant, $K_{eq}$(515° C.)=287.1, assuming unit activity for both Ni and NiO, then the ratio of $pH_2O/pH_2$ is equal to $K_{eq}$ At 515° C., then $Log(pO_2)$=2 $Log(K_{eq,Ni}/K_{eq,H2O})$=−22.2. The actual measured $pO_2$ was at least 4 orders of magnitude lower than this value, which means that the rate of reduction was limited by surface diffusion. That is, the surfaces of the NiO grains were initially reduced, but subsequent reduction required hydrogen to diffuse in through the Ni metal layer into the NiO interior and $H_2O$ to diffuse out. Even at the extremely low hydrogen flow rate of 10 sccm, the specimen apparently could not maintain equilibrium with the supplied gas.

It is possible to estimate the amount of time needed to fully reduce the specimen if equilibrium could be achieved. The amount of NiO in the unreduced specimen was about 2.40 g (0.032 mol). The 3 percent hydrogen and 97 percent argon gas mixture flowing at 10 sccm represents $7.34 \times 10^4$ mol/hour, so 43.6 hours would be required to fully reduce the specimen. The experiment actually ran for 42 hours. Obviously, a higher molar flow rate of hydrogen would shorten the reduction time at equilibrium, but it may not overcome the rate-limiting effect of slow surface diffusion that was observed. It is also not clear how much of a concern some residual unreduced NiO represents. As shown in FIG. 4, the conduction percolation limit was reached after about 30 hours. It may not be necessary to reduce additional NiO as long as cell overcharging, which dissolves nickel from the electrode, does not strip the electrode bare. At some point, the electrode resistance will increase exponentially, terminating the charging cycle. Subsequent discharging should redeposit nickel on the surface of NiO grains, restoring the low electrode resistance.

It is also possible to estimate the extent of NiO reduction by analyzing the weight change of the specimen. The specimen weighed 3.578 g prior to reduction. The weight of the specimen prior to reduction was derived from the measured density and physical dimensions. After completing the 42 hour reduction cycle, the specimen weighed 3.175 g. The weight loss of 0.403 g represents 0.025 moles of oxygen, or the number of moles of NiO reduced. The original specimen contained 0.032 moles of NiO, so the estimated extent of reduction is 78 percent.

Figure 5:
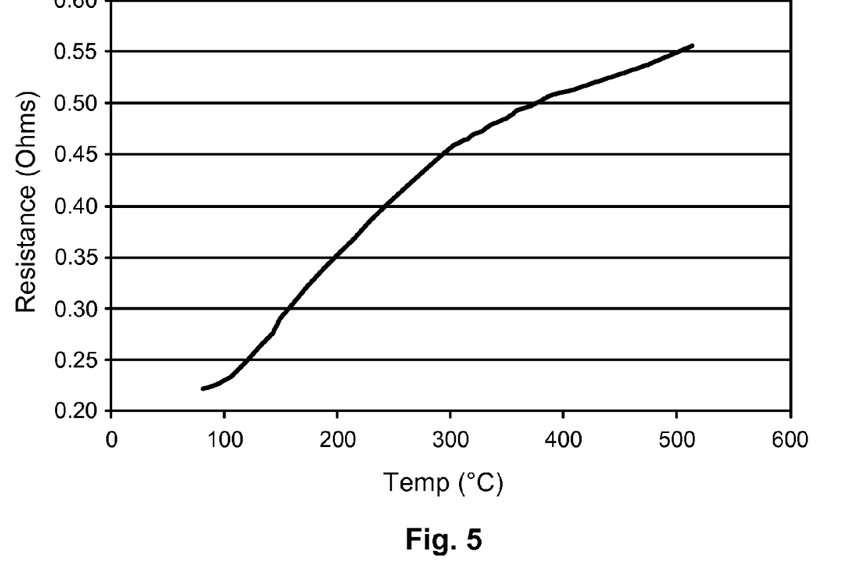
FIG. 5 is a plot showing resistance versus temperature during the final cool-down of the multiphase specimen from the steady state temperature of 515° C.

Referring to FIG. 5, the specimen resistance versus temperature during the final cool-down of the specimen from the steady-state reduction temperature of 515° C. is illustrated. The plot shows two important features: (1) a positive temperature coefficient of resistance (TCR) typical of metallic conduction; and (2) an abrupt change in slope at about 325° C. The change in slope is characteristic of nickel, and has been attributed to the ferromagnetic to paramagnetic transformation at the Currie temperature at 312° C. Accordingly, the plot shown in FIG. 5 is characteristic of the bulk electronic conductivity of nickel.

Figure 6:
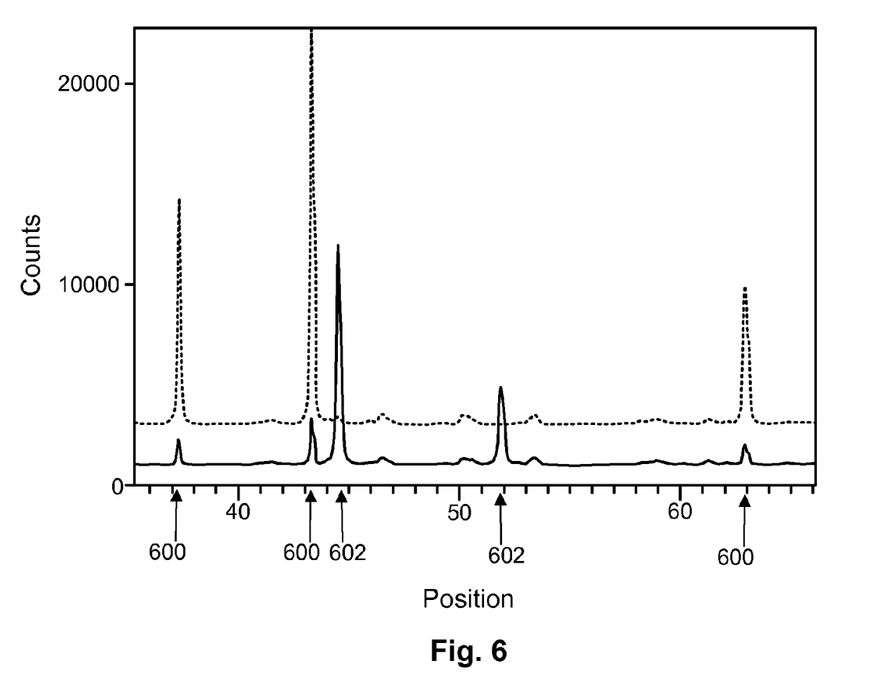
FIG. 6 is a plot showing XRD scans of the multiphase specimen before and after reduction.

Referring to FIG. 6, in some embodiments, it may be desirable for the Ni/Nasicon cermet to have sufficient mechanical strength to support the membrane 104, in such case the Nasicon phase in the cermet is approximately the same as the pure bulk Nasicon phase of the membrane 104. This condition may be conducive to co-sintering of the membrane 104 and the multiphase electrode 102a. Also, during sintering, some NiO is expected to dissolve in the Nasicon in the cermet, but in many embodiments this condition is acceptable since it does not affect the structure.

X-ray diffraction (XRD) scans of the specimen were obtained before and after reduction and are shown in FIG. 6. The broad peaks are typical of Nasicon (and more specifically Ceramatec Nas-GY Nasicon), and show no additional new phases from the pure material. The dashed line represents the scan for the NiO/Nasicon specimen fired at 1200° C. before reduction. The solid line represents the scan for the NiO/Nasicon specimen after reduction. The strong peaks 600 are associated with NiO. The strong peaks 602 are associated with Ni metal. All other peaks are characteristic of Nasicon. Neither XRD pattern shows any evidence of any other new phases. It may be observed that some residual NiO is present in the reduced specimen. The approximate ratio of peak intensities is about 12 percent suggesting a higher degree of completion of the reduction reaction (88 percent) versus the estimated value based on the measured oxygen loss (78 percent).

Figure 7:
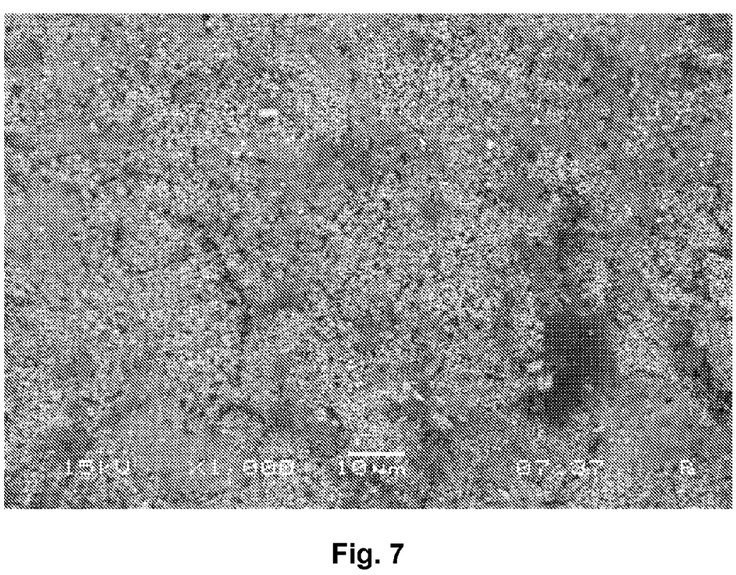
FIG. 7 is a scanning electron microscope (SEM) backscatter electron image (BEI) micrograph of a fracture surface of the reduced multiphase specimen at low magnification.

Referring to FIG. 7, a scanning electron microscope (SEM) backscatter electron image (BEI) micrograph of the fracture surface of the reduced specimen is shown at low magnification (1000×). The light colored regions are the porous nickel phase. The larger "glassy" darker regions are the Nasicon phase. In the sample preparation, no particular attention was dedicated to homogenization of the powders, so the macrostructure is not particularly uniform. It is anticipated that placing greater emphasis on powder homogenization would yield a more uniform macrostructure.

Figure 8:
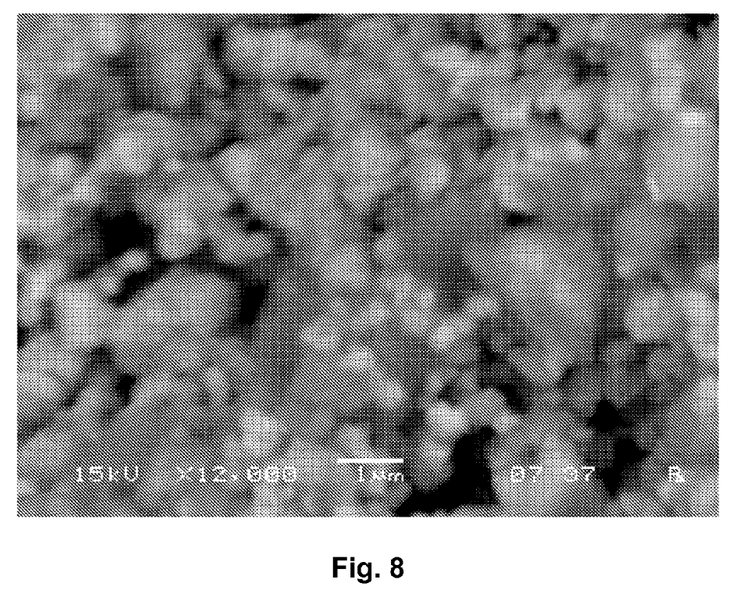
FIG. 8 is an SEM BEI micrograph of a porous nickel region of the reduced multiphase specimen at higher magnification.

Referring to FIG. 8, an SEM micrograph of a porous nickel region of the reduced specimen is shown at higher magnification (12,000×). As can be seen, a well-interconnected network of sub-micron nickel particles interpenetrates the much larger Nasicon grains. Some of the nickel particles appear to be isolated from the nickel network. These grains most likely will not participate in electrochemical charge transfer reactions unless nickel bridges are deposited during cell discharge, however in other embodiments, a degree of electrically isolated nickel phase is acceptable.

Figure 9A:
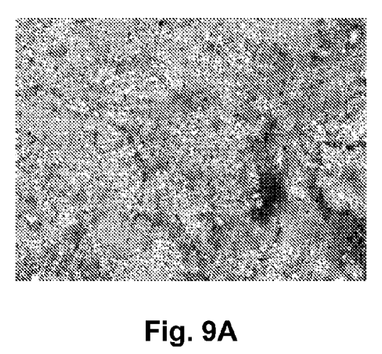
FIG. 9A is an SEM micrograph of the reduced multiphase specimen at 1000× magnification.
Figure 9B:
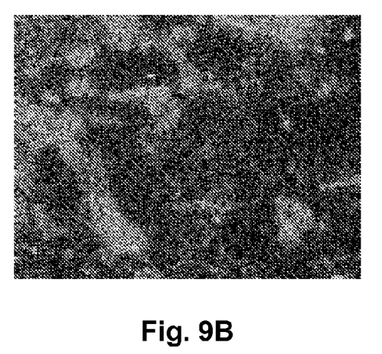
FIG. 9B is an SEM micrograph of the reduced multiphase specimen at 1000× magnification with an EDAX element map for zirconium (Zr)
Figure 9C:
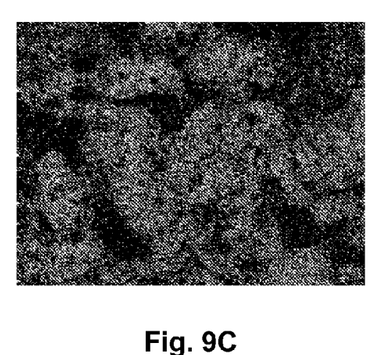
FIG. 9C is an SEM micrograph of the reduced multiphase specimen at 1000× magnification with an EDAX element map for nickel (Ni)
Figure 9D:
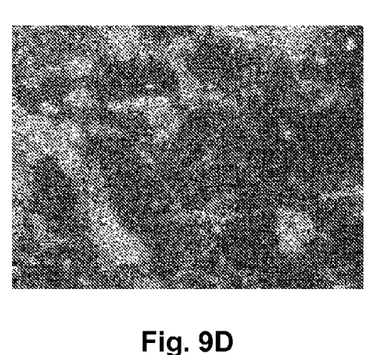
FIG. 9D is an SEM micrograph of the reduced multiphase specimen at 1000× magnification with an EDAX element map for phosphorus (P)

Referring to FIGS. 9A through 9D, various SEM micrographs and corresponding EDAX element maps for Ni, Zr, and P at 1000× magnification are shown. FIG. 9A is an SEM micrograph of the reduced multiphase specimen at 1000× magnification. FIG. 9B is an SEM micrograph of the reduced multiphase specimen at 1000× magnification with an EDAX element map for zirconium (Zr). The lighter regions in FIG. 9B indicate the presence of Zr, which is an indicator for Nasicon. FIG. 9C is an SEM micrograph of the reduced multiphase specimen at 1000× magnification with an EDAX element map for nickel (Ni). The lighter regions in FIG. 9C indicate the presence of Ni. Similarly, FIG. 9D is an SEM micrograph of the reduced multiphase specimen at 1000× magnification with an EDAX element map for phosphorus (P). The lighter regions in FIG. 9D indicate the presence of P, which is also an indicator for Nasicon.

As is evident in FIGS. 9A through 9D, the nickel-rich domains are clearly distinguishable from the Nasicon domains. The separate domains appear to be inter-penetrating with coarse feature sizes ranging from a few microns to tens of microns. This is an ideal macrostructure for the multiphase electrode 102a. Large, interconnected domains of Nasicon provide optimal structural integrity, while large domains of small, finely dispersed nickel particles provide optimal active surface area and a high degree of open porosity for good electrolyte infiltration.

The investigations documented in FIGS. 4 through 9D and associated text demonstrate that it is feasible to fabricate two-phase structures of Nasicon and nickel oxide by co-sintering in air, and that the structures may be reduced to mechanically strong cermets without adversely effecting the Nasicon phase. A highly conductive nickel phase may be produced that is distributed throughout the cermet such that substantially all of the nickel phase is contiguous. The microstructure, as revealed in the micrographs of FIGS. 7 through 9D, illustrates an excellent electrode structure. Such a structure includes a skeleton of dense, interconnected Nasicon, with ample interstitial open volume. The open volume in the Nasicon is ideally filled with a continuous network of small, interconnecting nickel particles with minimal nickel domains isolated from the conducting network.

Figure 10:
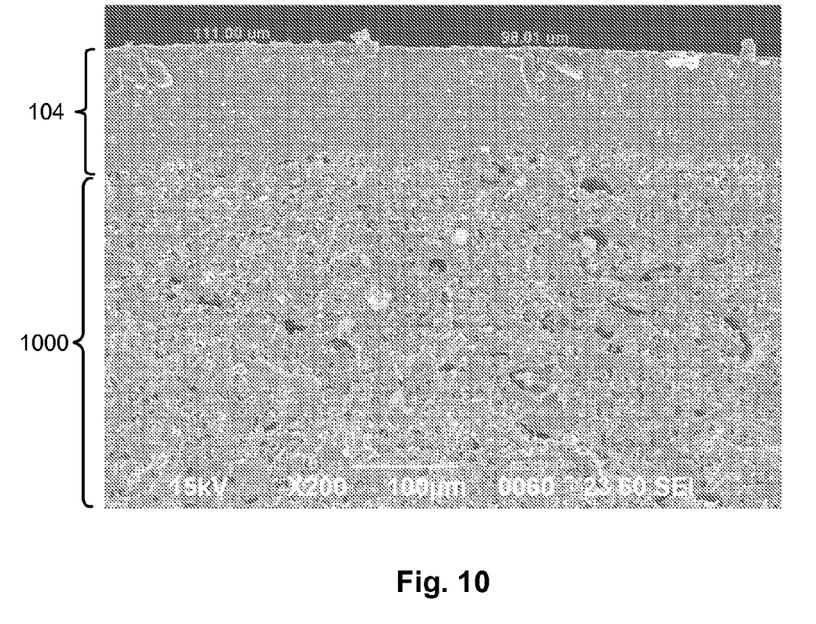
FIG. 10 is an SEM micrograph of a thin dense Nasicon membrane co-sintered on a porous Nasicon substrate.

Referring to FIG. 10, an SEM micrograph of a thin dense Nasicon membrane 104 supported by a porous Nasicon substrate 1000 at 200× magnification is illustrated. This specimen was produced using a fabrication process similar to that described in FIG. 2. The thickness of the Nasicon membrane 104 ranged from about 98 μm to 111 μm. This micrograph shows that fabricating thin electrode-supported Nasicon membranes 104 for use in electrochemical cells 100 is feasible.

Figure 11:
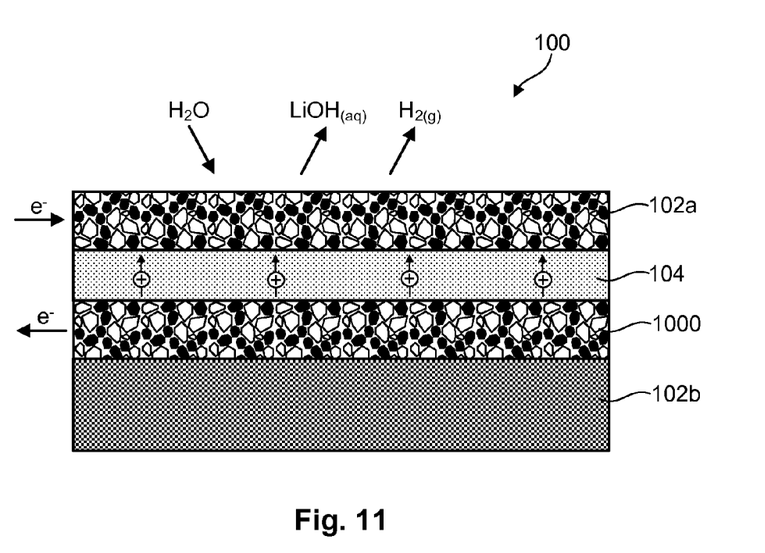
FIG. 11 is a high-level, cross-sectional view of one contemplated embodiment of a lithium-seawater battery in accordance with the invention.

Referring to FIG. 11, the structure and chemistry discussed in association with the electrochemical cell 100 illustrated in FIGS. 1A and 1B are presented only by way of example and not limitation. Indeed other structures and chemistries are possible and within the scope of the invention. For example, in selected embodiments, the electrochemical cell 100 is a lithium-seawater battery 100. In such an embodiment, the anode 102b contains lithium. Water in the form of seawater is reacted at the cathode 102a. A dense ionically conductive Lisicon membrane 104 separates the anode 102b from the cathode 102a. A cermet 1000 comprising copper metal and Lisicon acts as the current collector between the lithium anode 102b and the membrane 104. The cermet 1000 also provides open porosity for an organic polar solvent that contains dissolved lithium. A nickel/Lisicon cermet 102a, acting as the cathode 102a, is provided on the cathode side of the membrane 104 with open porosity sufficient to enable the ingress of water and the egress of hydrogen gas and aqueous lithium hydroxide.

The cell half reaction for the anode 102b of the lithium-seawater battery 100 is:

The cell half reaction for the cathode 102a of the lithium-seawater battery 100 is:

The net cell reaction is:

In one embodiment, to fabricate the lithium-seawater battery 100, a first slurry of Lisicon powder, copper oxide, pore former, binder, plasticizer, and solvent is prepared and cast into a first tape. A second slurry of Lisicon powder, nickel oxide, pore former, binder, plasticizer, and solvent is prepared and cast into a second tape. A third slurry of Lisicon powder, binder, plasticizer, and solvent is prepared and cast into a third tape. The three tapes are laminated together using heat and pressure (heat bonding) or by applying a solvent such as alpha terpineol and pressure. The tapes are organized such that when sintered at approximately 1000° C., the center layer is dense, nonporous Lisicon with a porous structure comprising copper oxide and Lisicon on one side and a porous structure comprising nickel oxide and Lisicon on the other side. The multi-layer structure may then be exposed to a reducing environment to reduce the structure to a copper metal and Lisicon cermet on one side of the membrane 104, and a nickel metal and Lisicon cermet on the other side of the membrane 104.

In yet another embodiment, the electrochemical cell 100 is a sodium-seawater battery 100. Such a battery 100 may use Nasicon-based cermets as the electrodes 102a, 102b, separated by a dense Nasicon-membrane 104.

The cell half reaction for the anode 102b of the sodium-seawater battery 100 would be:

The cell half reaction for the cathode 102a of the sodium-seawater battery 100 would be:

The net cell reaction would be:

The present invention may be embodied in other specific forms without departing from its basic principles or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A multi-layer structure comprising:
a multiphase electrode comprising a first phase intermixed with a second phase and a network of interconnected pores, the first phase comprising a ceramic material, and the second phase comprising an electrically conductive material providing an electrically contiguous path through the multiphase electrode, wherein the electrically conductive material in the multiphase electrode comprises a metal separate from other particles, wherein the metal was formed by reducing a metal oxide to the metal within the second phase, wherein the reduction of the metal oxide creates at least a portion of the interconnected pores, wherein the reduction of the metal oxide results in a residual amount of the metal oxide being present in the electrically conductive material; and
a substantially non-porous membrane physically attached to the multiphase electrode and comprising an alkali-metal-ion-selective ceramic material.

2. The multi-layer structure of claim 1, wherein the alkali-metal-ion-selective ceramic material comprises at least one of Nasicon, Lisicon, Li β"-alumina, and Na β"-alumina.

3. The multi-layer structure of claim 1, wherein the metal comprises one of nickel and copper.

4. The multi-layer structure of claim 1, wherein the network of interconnected pores is infiltrated with an electrolyte.

5. The multi-layer structure of claim 1, wherein the ceramic material in the multiphase electrode is selective to alkali metal ions.

6. The multi-layer structure of claim 5, wherein the ceramic material in the multiphase electrode comprises at least one of Nasicon, Lisicon, Li β"-alumina, and Na β"-alumina.

7. The multi-layer structure of claim 1, wherein the ceramic material in the multiphase electrode and the alkali-metal-ion-selective ceramic material in the substantially non-porous membrane are substantially the same material.

8. The multi-layer structure of claim 1, wherein the multiphase electrode is thicker than the substantially non-porous membrane.

9. The multi-layer structure of claim 8, wherein the multiphase electrode physically supports the substantially non-porous membrane.

10. The multi-layer structure of claim 1, wherein the substantially non-porous membrane is less than about 2 millimeters thick.

11. The multi-layer structure of claim 10, wherein the substantially non-porous membrane is less than about 100 microns thick.

12. The multi-layer structure of claim 11, wherein the substantially non-porous membrane is less than about 25 microns thick.

* * * * *